April 11, 1933.  F. W. MEYER  1,903,571
CHAIN GUIDING DEVICE FOR PORTABLE MOTOR TREE SAWS
Filed Jan. 8, 1932  2 Sheets-Sheet 2
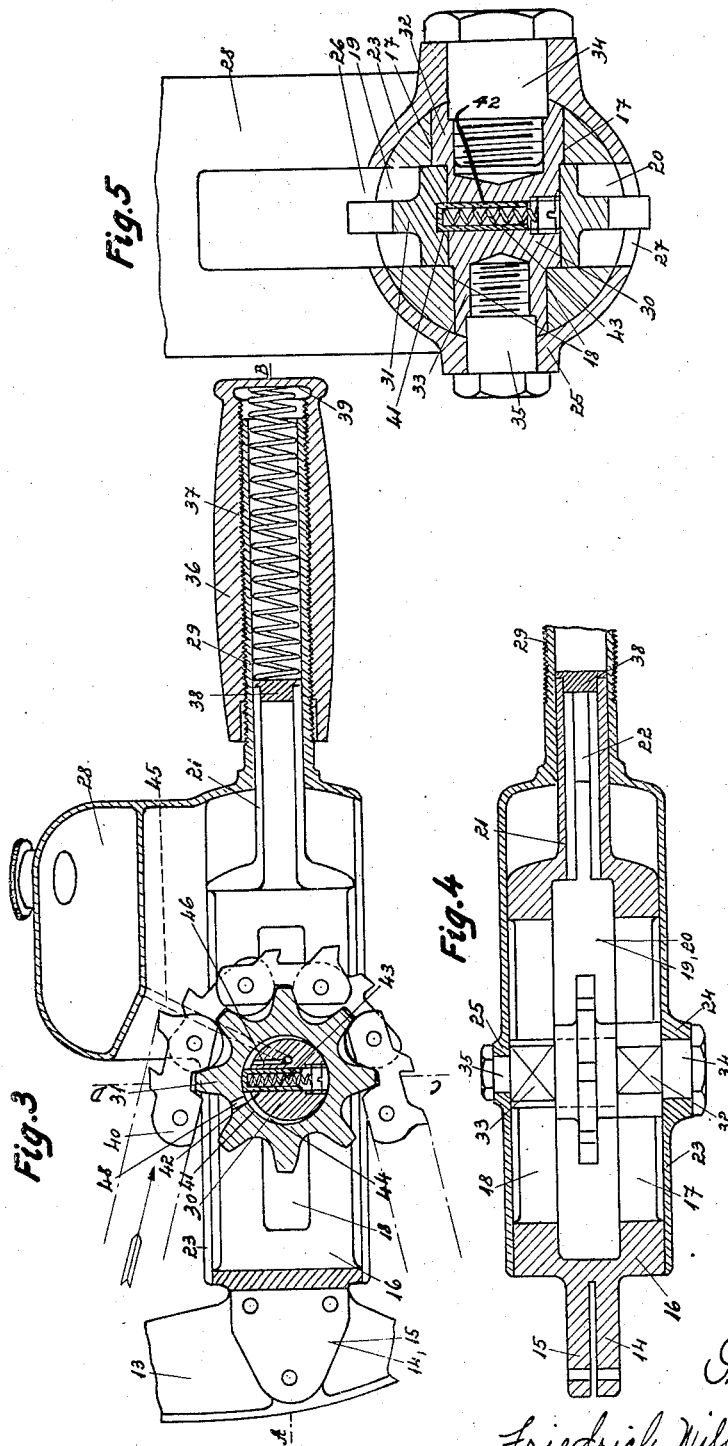

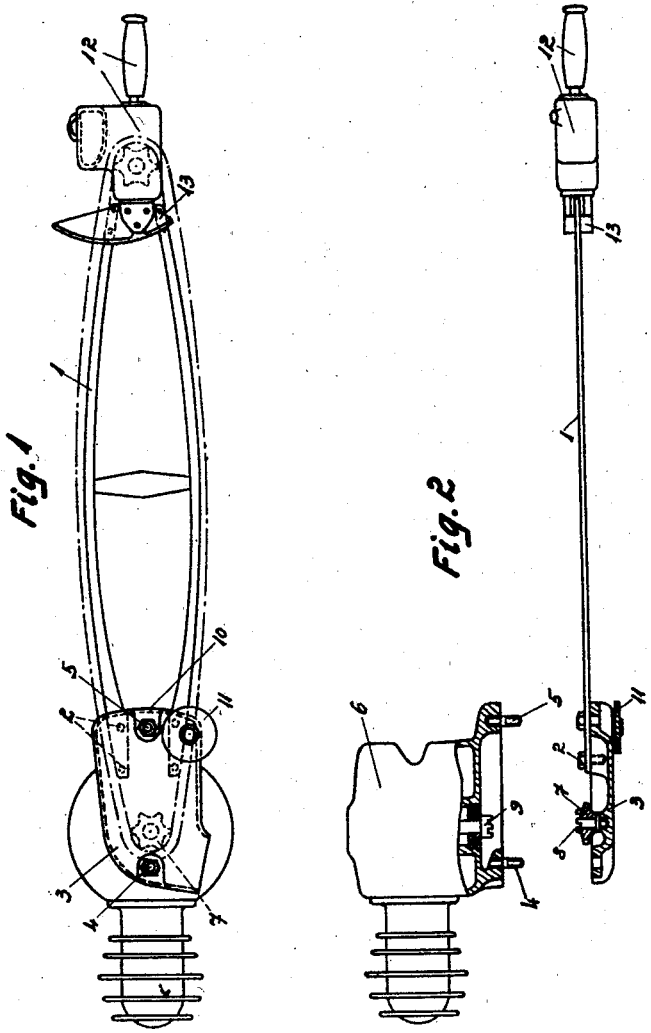

Patented Apr. 11, 1933

1,903,571

UNITED STATES PATENT OFFICE

FRIEDRICH WILHELM MEYER, OF VIENNA, AUSTRIA

CHAIN GUIDING DEVICE FOR PORTABLE MOTOR TREE SAWS

Application filed January 8, 1932, Serial No. 585,694, and in Austria January 13, 1931.

The invention relates to a guiding device for the saw chain especially of portable motor tree saws, in which the saw chain is guided on a rail and is tightened by means of a special tightening device cooperating directly or indirectly with this rail.

In general these guiding rails are directly fixed to the motor body, this construction, however, entailing the disadvantage, that the shipment of the machine and the transport to the place of operation meets with difficulties. If, on the other hand, the rail is dismounted for transport and is not refastened to the motor body before the working place is reached and operation is about to start, this means a very disagreeable extra work, especially since in every case the saw chain must be mounted and dismounted too. According to the invention the rail is not directly fixed to the motor body but to a separate part, preferably a cover, which, for the driving members of the chain, can be screwed on to the machine body and unscrewed from same in a simple manner. The gear wheel, driving the chains is journalled in the cover and is provided with entrainer claws which in placing the cover on the machine engage into the corresponding claws of the free end of the motor shaft. The chain always remains mounted whether the cover is being screwed on or being removed. The cover also serves as protecting device (guard).

The cover may be formed into a stop against which the working piece comes to rest during the sawing process. In order to eliminate the friction eventually arising between the stop and the working piece during the advance of the saw and in order to be able to put the saw to work comfortably even with an oblique direction of the cut, the stop is replaced or completed by a supporting roll of roughened or toothed surface which turns while the saw advances. This supporting roll may also be fixed to the motor body instead of to the cover.

With a view to enable the saw to carry out upward directed cuts too, the other end of the rail i. e. the handle end is also furnished with a stop or a supporting roll. In this case the piece of wood worked on, will rest against the stop above the rail.

A further feature of the saw guiding device according to the invention resides in the manner in which the tightening device cooperating with the rail is formed, rendering possible an easy mounting of the chain on the rail i. e. on the chain wheels supported by same and warranting an accurate guidance of the chain wheel which is displaceable in a known manner by means of a tightening device. In the known designs of this kind (German Patent 477,190) a chain wheel is rotatably supported by a bolt at the end of the guide rail, the bolt passing through two longitudinal slots of the fork shaped rail end (rail head) and being supported at both ends in bearings fixed in the guide bars of a tightening body provided with handle and spring, the said guide bars being longitudinally displaceable over the fork ends. By turning the handle, which is screwed on to the tightening device, round its longitudinal axis the spring is put under tension, and the toothed chain wheel is displaced in the direction toward the end of the guide rail, whereby the saw chain is tightened.

The guide bars of the tightening body used in this device known are made of channel irons. Their machining as well as that of the corresponding shaped parts of the fork ends presents great difficulties and it is scarcely possible to produce same with the accuracy required for realizing an exact fit. In this device the ends of the chain wheel bolts do not rest on the sliding surface of the fork ends, face to face, but, theoretically, are in touch with same along a line, a feature which is disadvantageous with respect to the accuracy of the guidance and the duration of the device. The mounting and the dismounting of the device is difficult as, first the chain wheel must be held suspended between the fork ends of the guide rail; then the guide bars of the tightening body are slipped over the fork ends and are adjusted in such a manner that the pillow blocks of the guide bars are made to coincide with the axis of the toothed wheel; finally the chain wheel bolt is inserted. As, for this method of mounting the saw chain must already be in place on the chain wheel, the keeping suspended of the chain wheel in the correct position appears still more difficult and there is no doubt that the mounting of the whole device is bound up with a considerable loss of time.

The present invention permits to do away with all these drawbacks. First of all, both the outer surfaces of the fork ends of the guide rail and the inner surfaces of the guide bars of the tightening body are formed cylindrically so that the sliding surfaces of the fork ends as well as the sliding surfaces of the guide bars may be produced by turning on the lathe, a process which is far cheaper and can be carried out with a far higher degree of accuracy than the machining of channel-shaped or rectilinear profiles. It is also possible, however, to form the fork ends of the guide rail and the guide bars of the tightening body into hollow cylinders giving a sliding fit so as to be longitudinally displaceable with respect to one another. The sliding slots for the chain wheel bolts are made in the walls of the inner hollow cylinder. Besides both hollow cylinders are provided vertically with slots of adequate size for receiving the chain wheel and the chain.

For facilitating both mounting and dismounting, the chain wheel bolt is made so short that it does not project beyond the outer wall of the inner hollow cylinder viz. the fork ends; the ends of the bolt being tapped i. e. provided with inner threads, for the purpose of fastening the bolt to the outer hollow cylinder viz. the guide bars of the tightening body. For assuring a face to face resting of the ends of the chain wheel bolts in the sliding slots of the inner hollow cylinder viz. the fork ends, the ends of the bolts are flattened on both sides; but the one end more than the other, so that, in consequence, the sliding slots of the inner cylinder viz. the fork ends are of different width. In this manner it has been made possible to laterally insert the chain bolt with the thinner end through the wider slot. The journal or pin on which the chain wheel runs between the bolt ends is of such a size as to permit its passing through the wider sliding slot.

A further improvement of the guiding device has been found in that an oil pump is fitted to the handle end, which pump is formed by the chain guide wheel and its journal and can be operated by the saw chain. This automatic lubrication of the rail and the chain renders superfluous any service from the part of the operator. The lubrication starts automatically when the saw begins to work and is automatically stopped as soon as the saw comes to a standstill. In consequence thereof, there is neither to be feared a running dry of the chain on the rail nor an excessive consumption of oil during the intervals of work.

In the drawings an embodiment of the invention is illustrated by way of an example, Fig. 1 being a side elevational view of the guidance device attached to a motor, Fig. 2 a plan of same when detached from the motor both figures being schematic illustrations; Fig. 3 is a longitudinal section through the handle with the tightening device and the oil pump, Fig. 4 a section through a part of the tightening device along the line A—B of Fig. 3 and Fig. 5 a section along the line C—D of Fig. 3. The guide rail 1 is attached to the cover 3 by screws 2, the cover itself being fastened to the motor body 6 by means of two screws 4 and 5. The driving gear wheel 7 for the saw chain is journalled in the cover and provided with entrainer jaws 8 which in mounting the cover on the motor body, will engage in the corresponding jaws of the free end 9 of the motor shaft. This shows that the saw chain need not be removed, when taking off the rail from the motor. The front edge 10 of the cover is formed into a stop against which the working piece comes to rest when the saw is functioning. Besides, a supporting roll 11 has been provided having a roughened or toothed circumferential surface which is of special advantage in case of oblique cutting, facilitating the putting to work of the saw. The tightening handle 12 is also provided with a stop 13, eventually also with a second supporting roll, rendering it possible to execute cutting operations in the upward direction. In this case the working piece finds a resting place at the stop 13 of the handle 12 above the rail. The guide rail is riveted in between the flanges 14 and 15 of the guide body 16. The body 16 is a cylindrical hollow body outwardly machined on the lathe and fitted with two horizontal sliding slots 17 and 18, the slot 17 being higher (i. e. wider) than the slot 18 (Fig. 3). Besides, the hollow cylinder is provided with two vertical slots 19 and 20, covering the whole length, the widths of which correspond to the width of the chain wheel and in which the chain wheel can move to and fro. The right end of the guide body 16 is formed into a hollow, cylindrical projection 21 which is also vertically slotted at 22, the width of the slot coinciding with the width of the saw chain.

Over the guide body 16, which has the shape of a hollow cylinder, a tightening body 23 is slipped which is also formed into a hollow cylinder, provided with two eyes 24 and 25 and with two vertical slots 26 and 27 assuring the mobility of the chain and the chain wheel. The tightening body 23 projects into a hollow cylinder 29 the outer surface of which is threaded. The chain wheel bolt 30 is formed in the middle into a round i. e. cylindrical running surface (pin) for the chain wheel 31 and is flattened at both its ends 32 and 33. The widths of the bolts taken over the flat parts are different, so as to correspond to the widths of the sliding slots 17 and 18. The ends of the bolts do not project beyond the outer wall of the inner guide body 16 which is hollow and cylindrically shaped. For fastening the bolts to the tightening body 23, the bolts are tapped i. e. provided with inner threads, the tap screws 34, 35 being used for fixation.

The handle 36 is screwed to the projection 29. The interior of this handle holds a spring 37 which on one side rests on the plug 38 of the projection 21 of the body 16 and presses on the other side against the bottom 39 of the handle 36. By rotating the handle round its axis the spring 37 is put under tension, causing the hollow body 16 and the tightening body 23 to move asunder, whereby the chain is tightened.

The chain is mounted on the guiding device in the following manner. The chain wheel 31 is introduced from above through the slot 19 of the hollow body 16 and is held in this position with one hand. Then the bolt 30 is introduced with the other hand from one side (i. e. from the right hand side with reference to Fig. 5) and passed through the bore of the gear wheel until the two flattened ends 32 and 33 of the bolt are resting in the pertaining sliding slots 17 and 18 of the hollow body 16. Then the closed saw chain is introduced according to Fig. 3 from right to left through the vertical slot 22 of the projection 21 and placed on the chain wheel. Then the plug 38 is stuck on. Further, the tightening body 23 is slipped over the hollow body 16 until the eyes 24 and 25 are opposite the bolt center. Then the two tap screws 34 and 35 are screwed in and tightened. Finally the handle 36 with the spring 37 already inserted is screwed on the projection and turned until the chain is sufficiently tightened. The chain wheel 31 which is driven by the saw chain 40 runs on the bolt 30. The chain wheel 31 is provided with an eccentric, ring shaped groove 41 into which the piston 42 is made to engage. Laterally, the piston fits the groove tightly, whilst it is pressed against the bottom of the groove by means of a spring. Owing to the eccentricity of this annular groove, a hollow space 44 is formed, which by rotating the chain, is made to wander round the bolt 30. This hollow space is alternately filled with oil out of the oil tank 28 through the channels 45 and 46 and emptied again by the channel 48. This alternating pressure and suction effect is caused by the hollow space gradually increasing when it reaches the piston in the course of the rotation, so that a vacuum is built up; whilst the space having arrived in front of the piston will continually decrease in volume so that the oil is pressed out of it. It is advantageous to provide the channel 48 with a small non-return valve, which is opened by the oil pressure, whilst it keeps the channel closed during the standstill periods so that no oil can escape.

Having thus described my invention, I claim:

1. In portable motor tree saws, in combination a guiding device for the saw chain consisting of a guide rail, two chain wheels, and a chain tightening device fixed on the outer end of the guide rail and having a handle, said tightening device consisting of two hollow cylinders displaceable one within the other, the outer cylinder having a tube shaped end, the inner cylinder being fixed to the guide rail and being fitted with guiding slots and with a bolt for the outer chain wheel having flattened ends, said bolt being fixed to the outer cylinder; the inner cylinder having a projection protruding into the tube shaped end of the outer cylinder, the handle being adapted to be screwed on said tube shaped end, a spring arranged between the said projection and the bottom of the handle for the purpose of tightening the chain by pushing asunder the inner cylinder fixed to the guide rail and the outer cylinder fixed to the outer chain wheel by turning the handle.

2. In portable motor tree saws, a guiding device for the saw chain as in claim 1, in which the displaceable cylinders and the projection of the inner cylinder are vertically slotted, the slot of the projection reaching to its end, to permit inserting the wheel and the chain.

3. In portable motor tree saws, a guiding device for the saw chain as in claim 1, in which the guide slots of the inner cylinder are of different width and the ends of the bolts engaged in these slots are flush with the outside of the inner cylinder.

4. In portable motor tree saws, in combination a guiding device for the saw chain consisting of a guide rail, two chain wheels connected therewith, one of these chain wheels having means for engaging with the corresponding part of the motor shaft, further a shield placed on one side of the wheel and corresponding to a flange on the motor, this shield having a bearing for this wheel and being connected to the rail and adapted to be fastened to and above said flange for the purpose of rendering possible a quick fit of the unit composed of chain wheels and guide to the motor as well as a rapid exchange of such units.

In witness whereof I affix my signature.

FRIEDRICH WILHELM MEYER.